US006371814B1

(12) United States Patent
Mäckel et al.

(10) Patent No.: US 6,371,814 B1
(45) Date of Patent: Apr. 16, 2002

(54) POTENTIAL DISTRIBUTION SYSTEM FOR THE POTENTIAL DISTRIBUTION TO CONSUMERS AND SUITED CONNECTORS

(75) Inventors: Rainer Mäckel, Königswinter; Thomas Schulz, Unterensingen; Gerhard Komander, Aichwald, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/463,680

(22) PCT Filed: Jul. 21, 1998

(86) PCT No.: PCT/EP98/04572

§ 371 Date: May 17, 2000

§ 102(e) Date: May 17, 2000

(87) PCT Pub. No.: WO99/06242

PCT Pub. Date: Feb. 11, 1999

(30) Foreign Application Priority Data

Jul. 30, 1997 (DE) ........................................ 197 32 697

(51) Int. Cl.[7] ................................................ H01R 4/24

(52) U.S. Cl. ....................................... 439/622; 439/409

(58) Field of Search ................................ 439/621, 622, 439/387, 389, 391, 395, 397, 400, 404, 409, 410, 417, 425, 426, 443

(56) References Cited

U.S. PATENT DOCUMENTS 4,148,540 A 4/1979 Hayes ........................ 439/425
4,237,441 A 12/1980 Van Konymenburg et al. .. 338/22 R
4,655,520 A * 4/1987 Cummings .............. 439/426 X
4,734,048 A * 3/1988 Giebel et al. ........... 439/409 X
5,057,033 A * 10/1991 Nadin ........................ 439/397
5,429,530 A * 7/1995 Zander et al. .............. 439/622
5,435,747 A * 7/1995 Franckx et al. ............. 439/409

FOREIGN PATENT DOCUMENTS

| | | | |
|---|---|---|---|
| CH | 654696 | A5 | 2/1986 |
| DE | 4015816 | C2 | 5/1994 |
| DE | 9409725.9 | | 10/1994 |
| DE | 4413977 | A1 | 10/1995 |
| DE | 29520691 | U1 | 9/1996 |
| DE | 29621319 | U1 | 3/1997 |
| EP | 0385202 | A1 | 9/1990 |
| GB | 2268637 | A | 1/1994 |
| GB | 2305548 | A | 4/1997 |

* cited by examiner

*Primary Examiner*—Renee Luebke
(74) *Attorney, Agent, or Firm*—Venable; Norman N. Kunitz

(57) ABSTRACT

The invention relates to a potential distribution system for the potential distribution to consumers and suited connectors. The potential distribution system contains a central supply line to which connectors can be joined to the consumer by means of a clamping device, preferably a cutting-clamping device, at freely selectable points. Each connector contains a self reset fuse for the consumer.

16 Claims, 4 Drawing Sheets

POTENTIAL DISTRIBUTION SYSTEM FOR THE POTENTIAL DISTRIBUTION TO CONSUMERS AND SUITED CONNECTORS

BACKGROUND OF THE INVENTION

The invention relates to a potential distribution system for distributing potential to electrical consumers or loads, particularly in motor vehicles, and to a suitable connector.

The number of electrical consumers or loads in motor vehicles is increasing. Because of the large number of variations due to special equipment and the like, this means that either cable harnesses having different designs and optimum dimensions for different equipment variations must be provided in a motor vehicle, or a cable harness designed for a maximum number of consumers is to be provided for all equipment variations, and is only partially utilized. To keep the number of variations in the cable set or loom under control, cable support points, fuse plug-in points or fuses are included to some extent, although they are not required in a part of the vehicles.

A further problem associated with the large number of variations relates to right-hand drive and left-hand drive vehicles. For example, the fact that a fuse box is disposed on the left or right side in the vehicle according to national regulations stipulates different line assemblies.

This in turn increases the costs for cabling and fuse protection for the consumers. Presently, blow-out fuses are being used for fuse protection of consumers and lines. Because of handling issues, these fuses are disposed in a limited number of central fuse boxes. The fuses must be able to be replaced following a fault caused by the vehicle driver. For this reason, the fuse boxes in which the fuses are disposed must be located so as to be accessible to the driver. This further complicates the cabling, because all of the cables must be guided to these boxes and, from there, to the electrical loads.

Furthermore, the degree to which a motor vehicle is equipped with electrical consumers, control and/or regulating devices stipulates more or fewer cables or fuses. In other words, an optimum cable set or loom would actually have to be designed for each equipment variation. This is impossible, not only in terms of engineering and production technology, but also from the standpoint of logic.

GB 2 268 637 provides a central supply line, in which assemblies can be connected to connectors having predetermined plug-in sites. In this case, with a required number of variations, a large number of—often unused—plug-in sites must be included. A central fuse must assure the electrical fuse protection.

DE 40 15 816 C2 discloses a cable set that permits a decentralized fuse arrangement. The fuses are integrated into a connector that is fixedly connected to the cable set. The connectors are provided at fixed locations as subsidiary distribution boxes that are distributed in a star shape. A fixed, predetermined number of connectable lines branches off from these locations. The fuses provided in the subsidiary distribution boxes reset automatically, in contrast to conventional blow-out fuses, which must be replaced after being triggered. The fuse protection in the subsidiary boxes can reduce the complexity of the cabling, but cannot avoid the inclusion of lines, plug contacts and fuses because of the number of variations.

The insulation-displacement technique, in which an insulated contact is contacted by means of an electrically-conductive knife edge that cuts through the insulation, and the stripped cable is clamped between the knife edges, has been employed for databus systems, as can be inferred, for example, from DE 44 13 977.

It is the object of the invention to provide a potential-distribution system that is easy to mount, particularly in motor vehicles, and a suitable connector that permits a high degree of flexibility in the integration of different consumers into an on-board network.

SUMMARY OF THE INVENTION

The above object generally is achieved according to the present invention by a potential distribution system for distributing potential to consumers that are distributed in a body, particularly a motor vehicle, wherein: a central supply line is disposed in the body, and a plurality of connectors are provided for connecting at least one connecting line connected to a consumer to the supply line; the connectors are connected by clamping device to a freely-selectable location on the supply line; and each connector has a self-resetting electrical fuse element for the connected consumer connected within the housing between the supply line and the connecting line. Modified, advantageous embodiments are disclosed and described.

The invention lies in replacing the cable harness or partial cable harness with a continuous, central supply line that is laid in remote regions of a body equipped with consumers, with a connector that is equipped with an integrated, self-resetting fuse device being clamped to the line at freely-selectable locations by a clamping device. The clamping is preferably effected by an insulation displacement device, in which an uninsulated potential-distribution bus can also be contacted by a simple clamping of the connector. The potential-distribution system permits a fast, individual fuse protection for the individual consumers, because the central supply line is only supposed to be protected against, for example, a direct body contact, but the individual consumers are protected individually by way of their connectors, so a few types of connectors having different fuse powers can connect all possible consumers of different loads. There is no continuous adaptation of the central fuse protection. The later installation of additional consumers also presents no problems, because the additional consumer is connected to a freely-selectable location on the supply line that is unoccupied as of yet, and is protected by the fuse element integrated into the connector. Under normal operating conditions, the fuse device conducts current to the clamped consumer lines and, in the event of an overcurrent, it becomes highly resistive. The consumer lines are preferably electrically connected to the cable strand via a single fuse device. A further preferred embodiment involves protecting the lines to the consumers individually or in groups in the cable-connecting device.

According to the invention, a connector is connected as needed to a central supply line at a freely-selectable location, which has a favorable spatial position with respect to one or more consumers to be supplied and/or controlled. The number of lines to be connected to the central supply line can be adapted to the respective requirements. The central supply line configured as a continuous electrical line need not be separated for this purpose.

At least one self-resetting fuse element is integrated mechanically and electrically into the connector. The particular advantage of this is that central fuse boxes are no longer necessary. However, such boxes can be provided for special applications, such as for fuse protection against a direct short circuit of the supply line to ground. No adaptation to the number of consumers is necessary. A connector of the invention can advantageously be integrated into an existing line assembly, regardless of national regulations.

The connector can be assembled quickly and easily, and assures a reliable electrical connection, because the lines producing the connection to the central supply line and the connection to the electrical loads are preferably embodied with the so-called insulation-displacement technique. It is especially preferable to separate the cable insulation with two metallic knife edges, and produce the electrical connection between the inserted conductor and the supply line via the metallic knife edges. Two knife edges are preferably disposed opposite one another, and associated in pairs, on each side of an inserted conductor. It is also possible, however, to produce the connection to branch lines, as well as to the central supply line, by means of a different contacting technique.

It is also possible to couple consumers to two central supply lines that particularly guide the electrical potential to a phase, zero conductor, the positive terminal of the battery or the positive of the battery downstream of the ignition switch terminal . In the coupling to two supply voltages, the voltage taps can advantageously be protected individually. In a coupling to a phase/zero conductor system, it suffices to provide a single fuse element for protecting a consumer.

Figure 1:
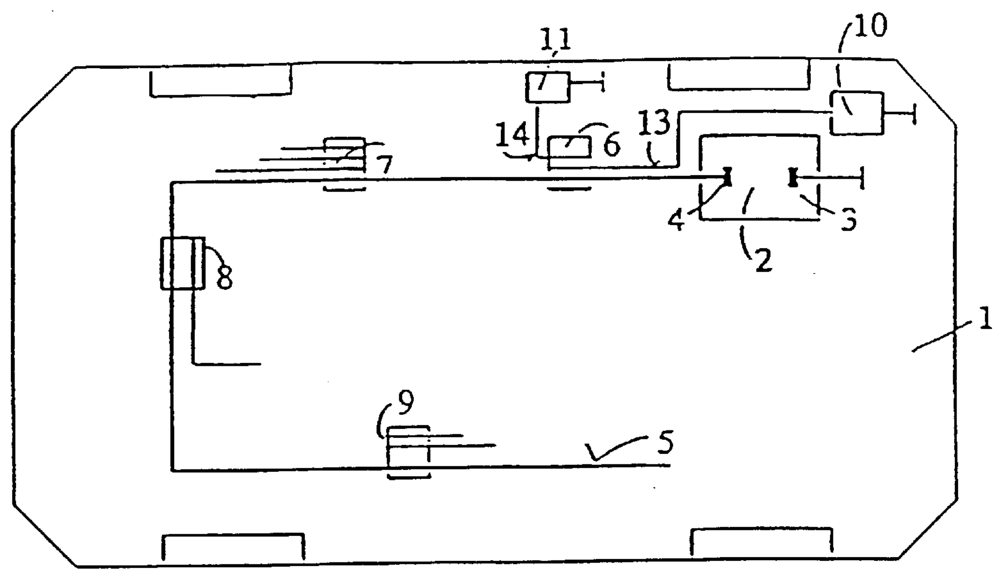
FIG. 1 is a schematic representation of an arrangement according to the invention.

FIG. 1 schematically shows a cabling structure in a body configured as a motor vehicle. A vehicle battery 2 having two poles 3 and 4 is provided in the vehicle 1, and is electrically connected by its pole 4 to a central supply line 5. The pole 3 is preferably a mass or ground connection, and the second pole 4 is a positive pole.

The central supply line 5 is preferably an insulated, continuous electrical line that is laid in remote regions through the vehicle 1. The special advantage of this is that no complicated cable harness need be laid. Rather, a single line, to which a connector can be connected at an arbitrary location, replaces the harness. The central supply line 5 is preferably dimensioned sufficiently to carry a high current for a plurality of consumers. In different equipment variations with electrical consumers, only the number of connectors need be adapted. The point of connection of the necessary connectors can advantageously be selected depending on the most favorable arrangement for the provided connectors.

Accordingly, a plurality of connectors 6, 7, 8, 9 is connected to the central supply line 5 at different locations in the motor vehicle 1, and with a different number of lines. The connector 6 supplies consumers 10 and 11 with voltage. For this purpose, separate branch lines 13 and 14 are disposed between the consumers 10, 11 and the connector 6, and, in the connector 6, these lines are electrically connected to the central supply line 5 by way of contact devices 18, 19, 20, 21, 24, 25, 26 and 22, and one or possibly more fuse elements 23 (See FIGS. 4 and 5). Other arbitrary consumers supplied by other connectors 7, 8, 9 are not shown.

Figure 2:
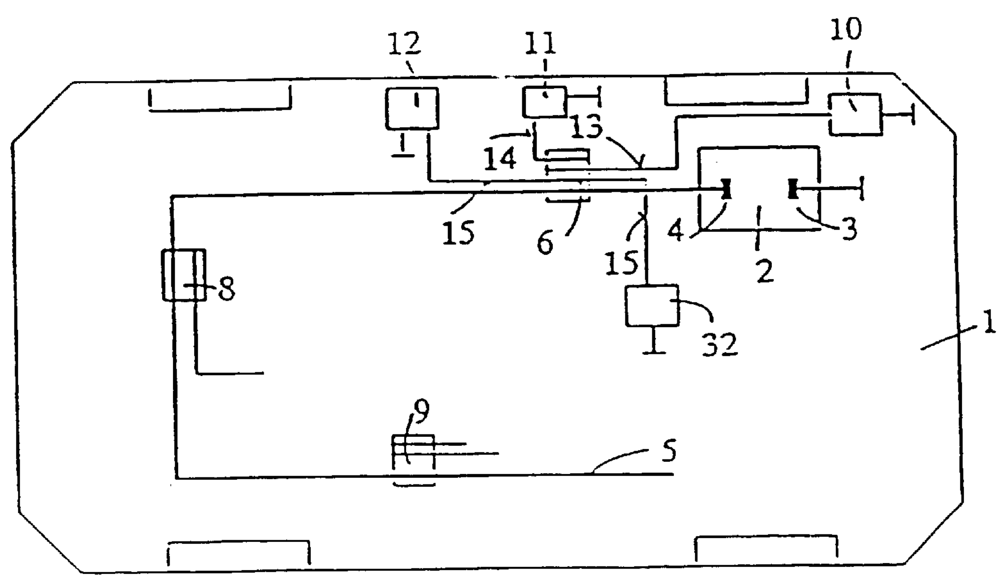
FIG. 2 shows a modified arrangement according to the invention.

FIG. 2 shows a further embodiment of the invention. The arrangement extensively corresponds to the arrangement illustrated in FIG. 1. The connector 6 supplies two consumers 12 and 32, in addition to the consumers 10, 11, via common, dedicated line 15, which, in the connector 6, is contacted in its central region with the supply line 5 by way of a dedicated contact device 21, and is connected by its ends to a respective consumer 12, 32 as shown in FIG. 4.

Figure 3A:
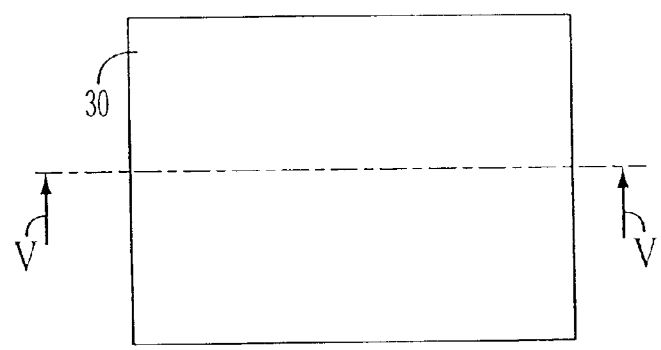
FIG. 3*a* is a plan view of the lid of a connector according to the invention.
Figure 3B:
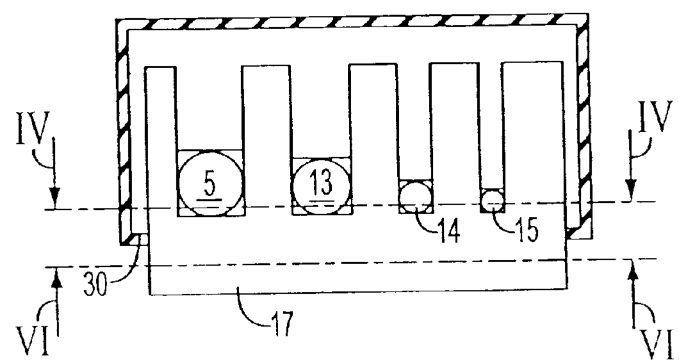
FIG. 3*b* is a schematic side view of the conductors of a connector according to the invention.
Figure 5:
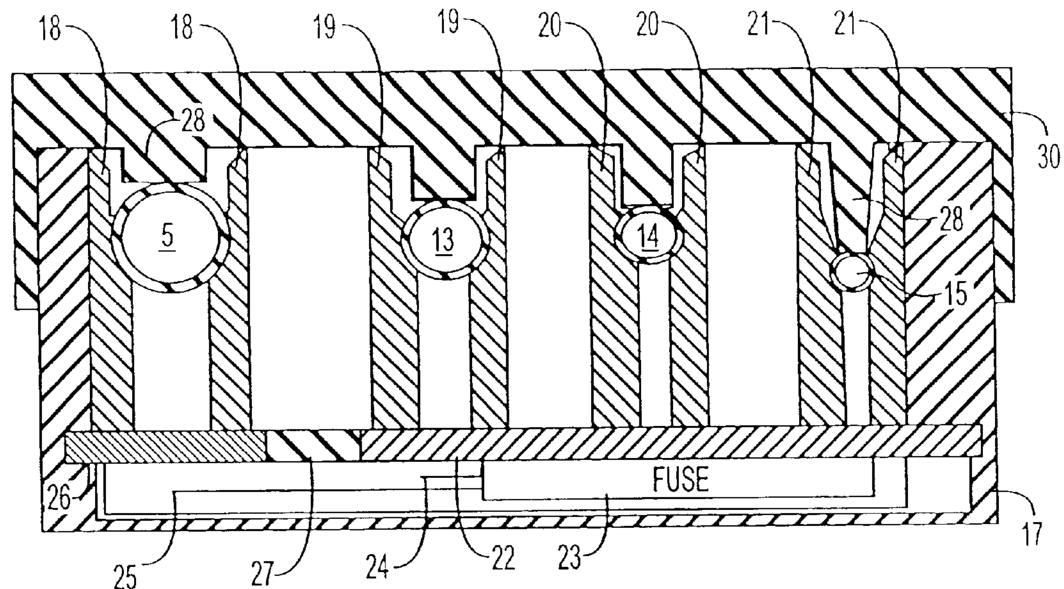
FIG. 5 is a further sectional view of the connector.
Figure 6:
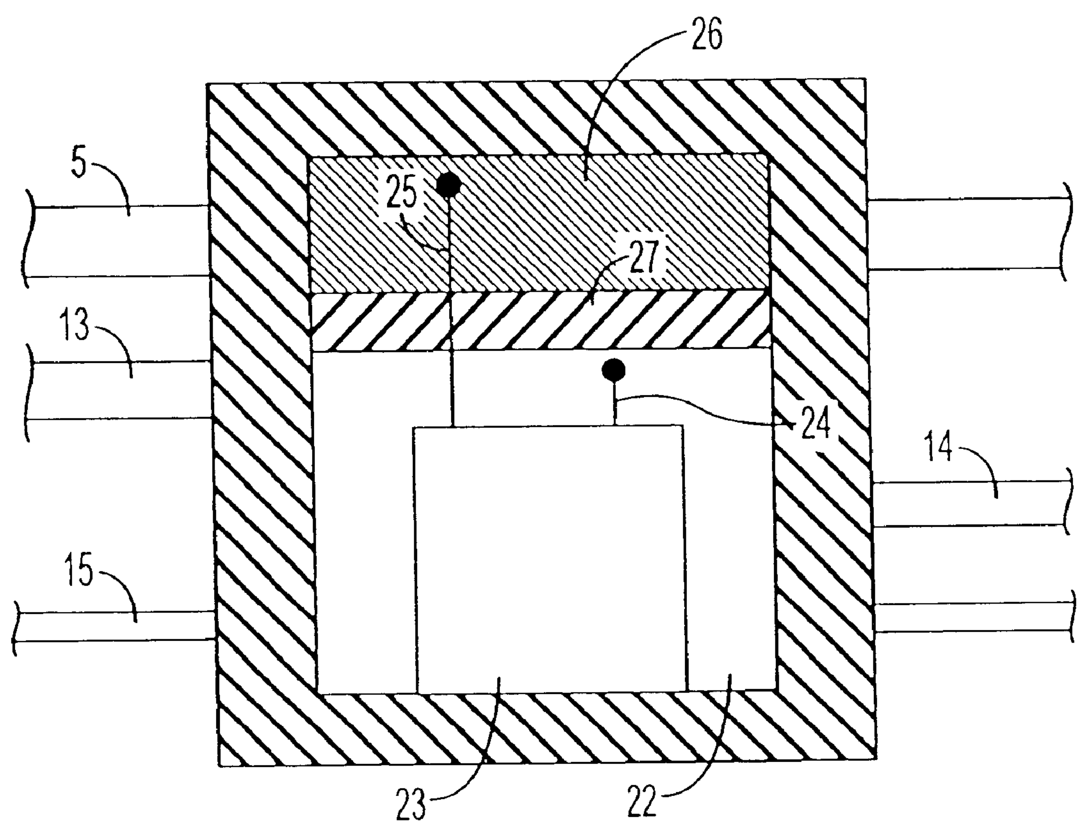
FIG. 6 is a further sectional view of the connector.

FIG. 3*a* is a plan view of the housing lid 30 of a connector according to the invention. FIG. 3*b* is a section through a preferred embodiment of the connector according to the invention. The schematic representation of the connector in FIGS. 1 and 2 is a section along the line V—V from the plan view of a connector. FIGS. 4 through 6 are views of the sections along IV—IV, V—V and VI—VI respectively, of FIGS. 3*a* and 3*b*. The central supply line 5 and the connecting lines 13, 14, 15 extend parallel to one another in the connector, and are preferably laid in suitably-shaped depressions in a lower housing part 17. The lower housing part 17 is closed by a lid 30. The lower housing part 17 and/or the lid 30 comprise(s) an electrical insulating material, particularly a thermosetting plastic or a thermoplastic. In a further advantageous embodiment, the connector, particularly the lid (30) and/or the lower housing part (17) is or are provided with a metallic cladding that is insulated against electrical contact elements and lines inside the housing.

Figure 4:
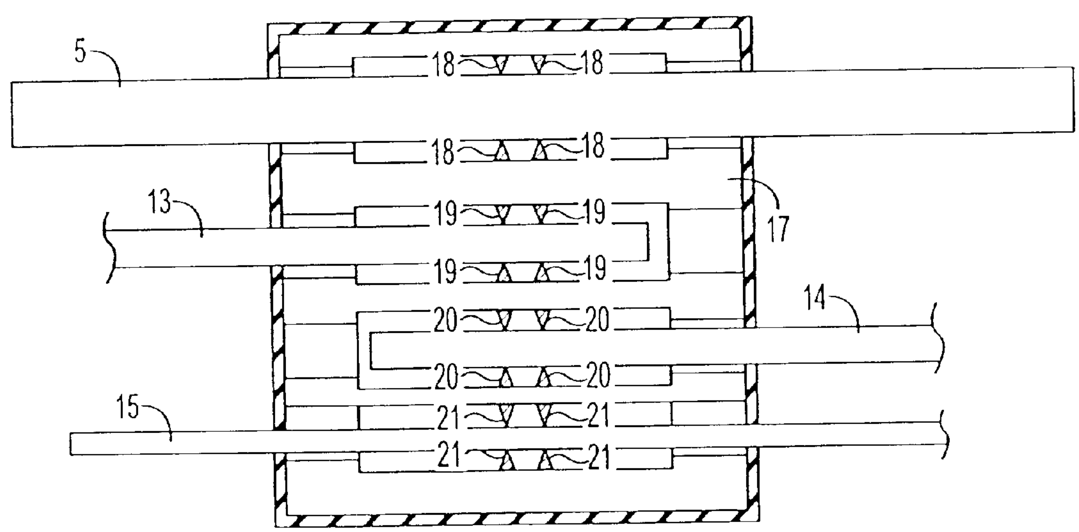
FIG. 4 is a first sectional view of the connector.

FIG. 4 is a plan view without the lid 30, in the sectional plane IV—IV. The metallic knife edges 18 of a contact device contact the central supply line 5. The connecting lines 13–15 are contacted by the metallic knife edges 19, 20, 21 of further integrated contact devices. The knife edges 18, 19, 20, 21 preferably comprise two pairs of oppositely-located, individual knife edges. The knife edges cut through the insulation of a cable to be contacted, and assure a strong metallic connection between the knife edge and the cable core. Additionally, in view of this type of clamping connection, the connector subsequently can be disconnected from the supply line if desired.

As illustrated in FIG. 5, on one side of the wire, a space that preferably tapers downward toward the lower housing part 17 is formed between the adjacent knife edges. FIG. 5 is a sectional side view of the conductors and knife edges in the sectional plane V —V. The size of the intermediate space is selected to correspond to the diameter of a cable or wire 5, 13, 14 or 15 to be contacted.

In a preferred embodiment, the knife edges 19, 20, 21 are electrically connected to one another by a conductive connecting part 22. In this embodiments, an insulating intermediate part decouples the central supply line 5 from the knife edges 19, 20, 21 and the connecting element 22. The lower housing part 17 is preferably shaped such that, during the cutting and later clamping processes, a sufficient counterforce can be exerted on the respective cable to be contacted, which assures reliable contacting of the cable by way of the knife edges.

The knife edges 18 that contact the central supply line 5 are connected, so as to be electrically conductive, to a conductive part 26 in the lower region of the cable receptacle of the central supply line 5.

A fuse element 23 that automatically resets in the event of a fault, particularly an occurrence of overcurrent, produces a protected electrical connection between the central supply line 5 and the connecting lines 13, 14, 15. The fuse element 23 has two connections 24, 25. The connection 25 of the fuse element 23 is connected to the electrically-conductive element 26, which is connected, with the knife edges 18, to the central supply line 5. The connection 24 is connected to the electrically-conductive connecting element 22 contacted by the knife edges 19, 20, 21. The fuse element 23 is disposed approximately parallel to the connecting element 22. The fuse element 23 which may be a bi-metal element, preferably comprises a carbon-containing polymer. Under normal conditions, the polymer has a low resistance, and can support a sufficient current. If an excessively-high current is flowing, the polymer heats up and becomes highly resistive. In the event of a fault, a low residual current flows, which suffices to keep the polymer highly resistive. When the fault is remedied, the polymer cools again and has a low resistance.

To assure fast assembly and a reliable electrical and mechanical connection, the lid 30 is placed onto the lower housing part 17. Pins 28 disposed on the underside of the lid 30 help to press the central supply line 5 and the connecting lines 13, 14, 15 into the space provided between the respective knife edges for receiving the cable during assembly. The knife edges cut through the cable insulation, thereby producing an electrical connection. The pin length determines the depth to which the cables are pressed into the intermediate spaces.

An advantageous embodiment lies in the fact that the knife edges do not extend parallel in the intermediate spaces provided for receiving the cable, but their spacing narrows in a V shape. This embodiment is not shown. The pins are preferably connected to the lid by springs. The pins can advantageously be of identical length. An advantage is that cables having different diameters can be pressed into the intermediate spaces provided for receiving the cable, without it being necessary to provide different geometries or dimensions for the pins or knife edges.

FIG. 6 shows a section VI–VI[1] through the housing floor. The electrical contact surface 26 to the central supply line 5 is connected to the connection 25 of the fuse element 23, and the connection 24 of the fuse element 23 is connected to the electrical contact 22 of the connecting lines 13, 14, 15. The insulating intermediate part 27 separates the electrical connection between the central supply line 5 and the connecting lines 13, 14, 15. It is also possible to provide fuse protection for the connecting lines 13, 14, 15 individually in the connector, and not together with a single fuse element 23, as shown in the figures. The fuse element 23 has a large surface, and is preferably insulated against the connecting element 22 and disposed on the underside of the connecting element. During normal operation, the supply current flows from the central supply line 5 into the element 26 via the knife edges 18, and from there through the fuse element 23 and its connection 24 and into the connecting element 22 via the connection 25, and from there into the respective connecting lines 13, 14, 15 and its connected consumers via the knife edges 19, 20, 21. In the event of a fault, particularly an excessively-high current flow, the fuse element 23 becomes highly resistive, and the current flow into the consumers is interrupted.

Figure 5A:
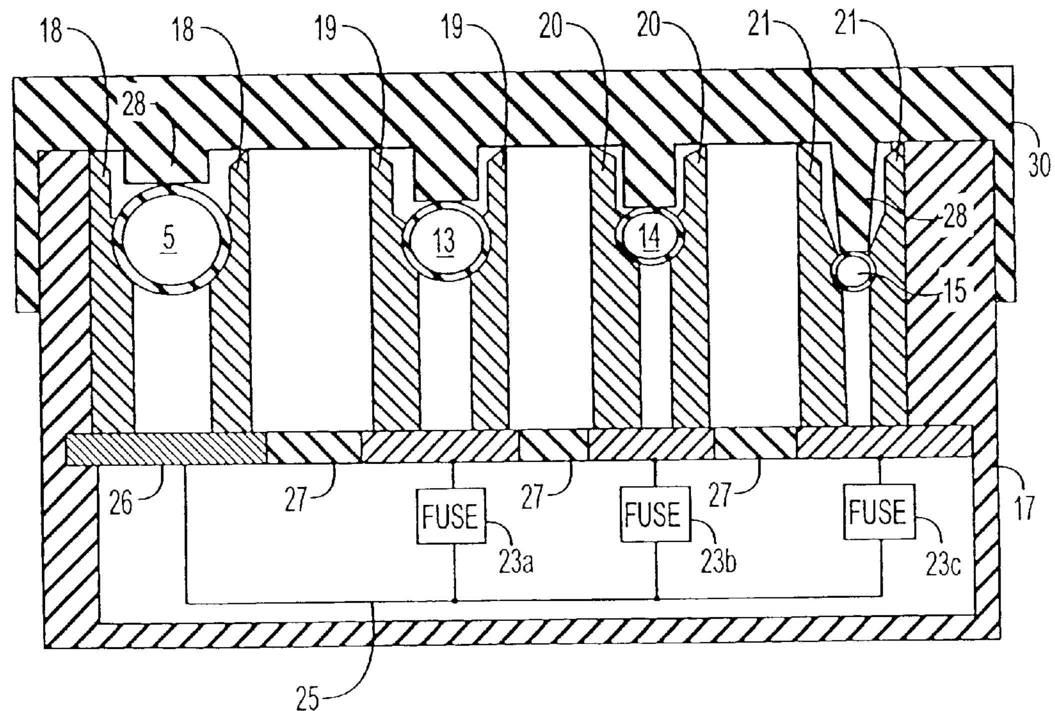
FIG. 5*a* is a sectional view similar to FIG. 5 showing a modification of the connector.

A modified arrangement wherein the connecting lines 13, 14, 15 are individually proved with fuse protection is shown in FIG. 5*a*. As shown, each of the knife blades 19, 20 and 21 for the connecting lines 13, 14, 15, respectively, is connected via a respective fuse 23*a* to the line 25 connected to the element 26 for the supply line 5. Additionally, the connection element 22 is segmented by additional insulating spacers 27 provided between the respective knife blades 19, 20 and 21.

The arrangement according to the invention permits a high flexibility in the layout of the electrical supply, especially in motor vehicles. The cabling is simple: It requires no complicated cable harness that is optimized for individual equipment variations. The necessity of guiding lines back from the consumer to central fuse boxes is completely eliminated if the connectors exclusively provide decentralized fuse protection for the consumers.

What is claimed is:

1. A potential-distribution system for distributing potential to consumers that are distributed in a body, comprising:

a central supply line disposed in the body;

a plurality of connectors each connecting at least one consumer, via at least one connecting line, to the supply line, with the connectors being connected by a respective clamping device to a freely-selectable location on the supply line; and wherein each connector has a self-resetting electrical fuse element for the connected consumer, and a plurality of connecting lines are connected to the supply line via a respective connector .

2. The potential-distribution system according to claim 1, wherein each connector is connected to the supply line with an insulation-displacement device.

3. The potential-distribution system according to claim 1, wherein the clamping device is subsequently detachable from the supply line.

4. The potential-distribution system according to claim 1, wherein the body is a motor vehicle.

5. The potential-distribution system according to claim 1, wherein, within the respective connector, the connecting lines are individually protected with individually-associated fuse elements.

6. The potential-distribution system according to claim 1, wherein, within a respective connector, the connecting lines are protected in groups with a respective fuse element associated with each group.

7. The potential-distribution system according to claim 1, wherein each connecting line is connected, with an insulation-displacement device or devices, to the connector.

8. A connector for distributing potential to consumers that are distributed in a body, comprising:

a clamping device to clamp the connector to a freely-selectable location on a supply line to electrically connect a connecting line, connected to the connector and to a consumer, to the supply line;

a self-resetting electrical fuse element for a connected consumer disposed in the connector and electrically connected between the supply line and an associated connecting line; and a plurality of connecting lines connected to the supply line in the respective connector.

9. The connector according to claim 8, wherein the clamping device is an insulation-displacement device for connection of the connector to the supply line.

10. The connector according to claim 8, wherein the fuse element comprise a carbon-filled polymer.

11. The connector according to claim 8, wherein the body is a motor vehicle.

12. The connector according to claim 8, wherein the connector is formed from a housing having a lid and a lower housing part, with pairs of oppositely-located metallic knife edges disposed in notches provided for receiving the supply line and at least one connecting line for a consumer, the knife edges are respectively in electrical contact with one or more metal connecting parts, with the knife edges that are connected to the supply line and an associated said connecting part being electrically insulated from the connecting part of the at least one connecting line, and being connected to one another only by the fuse element, and pins are provided in the lid for pressing the supply line and the at least one connector line in between the respective knife edges.

13. The connector according to claim 12, wherein at least one of the lid and the lower housing part comprise a plastic material.

14. The connector according to claim 8, wherein within the connector, the connecting lines are individually protected with individual associated fuse elements.

15. The connector according to claim 8, wherein in the connector, the connecting lines are protected in groups with a respective fuse element associated with a respective group.

16. The connector according to claim 8, wherein each connecting line is connected to the connector by an insulation-displacement device or devices.

* * * * *